F. L. SESSIONS.
ELECTRIC MOTOR.
APPLICATION FILED AUG. 23, 1906.
965,543.
Patented July 26, 1910.
2 SHEETS—SHEET 1.
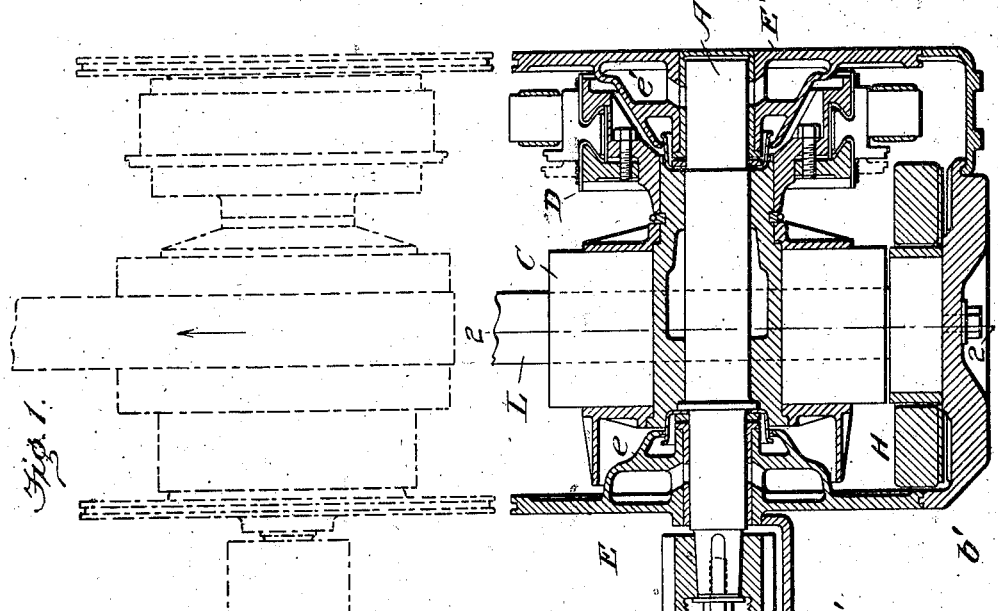
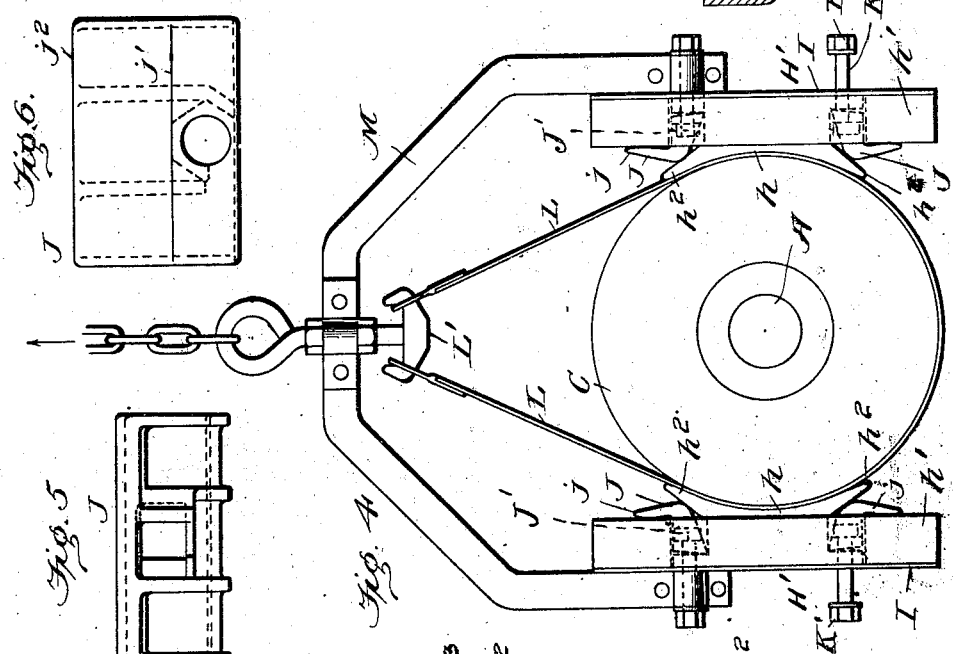
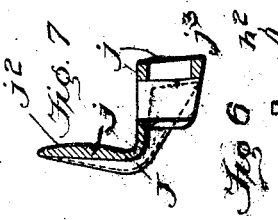
Witnesses
Geo B Pitts
V. Curtis Lammond
Inventor
Frank L. Sessions
By H. H. Bliss
Attorney

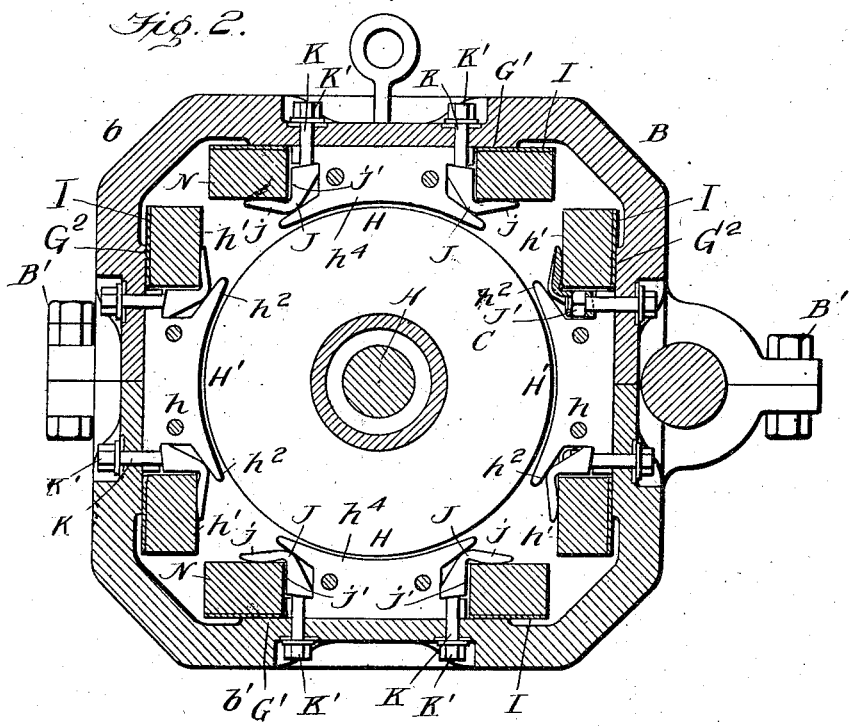

UNITED STATES PATENT OFFICE.

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO

ELECTRIC MOTOR.

965,543.　　　　　　Specification of Letters Patent.　　Patented July 26, 1910.

Application filed August 23, 1906. Serial No. 331,781.

*To all whom it may concern:*

Be it known that I, FRANK L. SESSIONS, a citizen of the United States, residing at Columbus, in the county of Franklin and State of Ohio, have invented certain new and useful Improvements in Electric Motors, of which the following is a specification, reference being had therein to the accompanying drawing.

This invention relates to improvements in electric motors, it pertaining more particularly to motors of the closed field or box field form.

The object of the invention is to provide such a construction and arrangement of parts in such a motor that they can be readily separated when it is necessary to obtain access to the parts in the interior of the box.

Figure 1 is a longitudinal central section of a motor embodying my improvements. Fig. 2 is a transverse section on the line 2—2 of Fig. 1. Fig. 3 is a transverse section showing the top of the field removed and the interior parts in the positions occupied when they are to be removed from the lower field sections; Fig. 4 shows the armature and the removable field magnets suspended from the lifting devices; and Figs. 5, 6, and 7 are detail views of one of the clamping plates; and Fig. 8 is a side view of one of the wrought plates or laminæ of which the pole pieces are composed.

The motor shown in the drawings is constructed with the following parts:

A is the armature shaft to which are secured the armature C, and the commutator D. As concerns the details of these they may be of any known or preferred type. The armature shaft is mounted in bearing plates E, E', its supporting bearings being indicated by *e, e'*. The field has the peripheral part or field frame indicated by B, this being approximately quadrangular in cross section. It is formed in two parts *b, b'*, that is an upper half and a lower half which are separable on a plane of division passing through the axis of the armature. The bearing plates E and E' in which the shaft is mounted are fitted to apertures in the ends of the field, and when the field sections *b, b'* and the plates E, E' are secured together they form a closed box containing the operative parts of the motor. When the field is separated and the armature removed, as hereinafter described, the bearings E E' are bodily removable, with the armature, from the apertures in which they fit, as shown in dotted lines in Fig. 1. The field B supports four field magnets H, H, H', H'.

Heretofore it has been the practice to remove the armature endwise or axially from the field; or to divide the field diagonally between the poles; or to divide both the field and one or more poles, the latter being consequent poles without coils. For important reasons it is desirable that the plane of division of the field should be transverse to two of the poles and their coils. The division of the field diagonally is inconvenient in manufacture and in subsequent manipulation, and it is desirable for compactness, and low mounting of a motor, that the vertical distance from the armature axis to the exterior of the bottom of the field be as short as possible. And for the best results in action, all of the poles should have field coils. An important object of the present invention is to divide the field most advantageously for manufacture, for compactness, and for repair, which involves a separation of the field on a plane transverse to one or more of the field coils; and to enable this object to be practically realized by proper arrangement and attachment, relative to the field, of the field coil or coils which thus cross the said plane of separation. Ordinarily such plane of separation is horizontal, and such a construction is illustrated, wherein H, H indicate the upper and lower vertically arranged magnets and H', H', the horizontal or lateral magnets. The core parts or pole pieces of the magnets H—H are shown at $h^4$, and their field coils at N. These cores and coils, so far as the present invention is concerned, may be secured to the field frame permanently or in any desired manner, but I have shown them secured by bolts K and clamping plates J, the form of fastening devices which I use to secure the pole pieces and coils of the side magnets H'—H' in position. The field frame is formed with plane surfaces or seats G' against which the pole pieces and coils are clamped, the coils being backed by plates I. When the upper and lower sections of the field are separated from each other, the pole pieces and coils of the magnets H—H need not be disturbed. The side magnets H'—H', however, are situated so that their pole pieces *h* and coils *h'* are bisected by the plane of division of the field sections and, as the tips $h^2$ of the pole pieces partially embrace the armature, it is impossible to remove the armature laterally or radially (as distinguished from endwise or axially) unless provision is made for removing the pole pieces $h$ and coils $h'$. Such provision is made in the construction now to be described. The upper and lower field frame sections are formed with plane surfaces $G^2$ to receive the flat outer faces of the pole pieces $h$ and coils $h'$, the latter being backed by plates I as shown. Peculiarly constructed clamping devices consisting of bolts K and clamping plates J serve to hold the poles $h$ and coils $h'$ firmly in position and, at the same time, permit their ready removal. The clamping plates J are approximately Z-shaped and each has one of its end sections formed with a socket to receive the nut $J'$ of bolt K. The face $j'$ of this end section is beveled or inclined so that only the rounded corner $j^3$ bears against the lip of the pole piece. The opposite end section $j$ of the plate has a rounded face $j^2$ adapted to bear against the inner surface of the coils $h'$. The clamping plate is drawn to place by means of the bolt K, which passes through the lip of the pole piece and through the wall of the field with its head $K'$ on the outside. By turning the bolt its nut $J'$, being held against rotation in its socket, is made to exert pressure on the clamping plate which in turn transmits the pressure to the pole piece and coil. The bottom of the socket of nut $J'$, is crowned or otherwise formed so that the clamp J is free to rock somewhat, as the pole piece and coil are being forced into position. Thus the plate J is in effect a lever which serves to divide the pull of bolt K between the pole piece and coil in the desired ratio.

As many of the clamps J may be used as are found necessary to properly hold the coils and pole pieces. As shown there is one at the upper side and one at the lower side of the pole, each being held by a bolt K, as described.

A motor having its parts constructed and arranged in the way which has been set forth can be readily taken apart by following steps which will be readily understood from an inspection of the drawings and the above description. The upper section $b$ of the field is first released from the lower section by withdrawing the bolts at $B'$ which fasten them together. Then it is elevated after the upper bolts K of the lateral magnets are withdrawn. This leaves in the lower section of the field the armature, the shaft, the end bearings E, $E'$, the bottom field magnet and the two side magnets $H'$, $H'$. To remove all of these except the bottom magnet H the lifting band L is passed around the armature and the two ends of the band secured to a lifting hook $L'$. Then the yoke M is secured to each of the field magnets $H'$, this yoke straddling the armature and having a leg for each field magnet. It can be secured to the latter by bolts in the apertures which normally receive the bolts K. The yoke M can be connected to the same lifting device which supports the armature band L, as for instance the chain or cable of a lifting crane. Then, the lower bolts K of the side magnets having been removed, upon the application of power to the lifting devices, the band L raises the armature, and, simultaneously, the yoke M pulls up the two side magnets $H'$, $H'$, the latter being free to move upward across the plane surface $G^2$ of the field frame. As the armature and the magnets rise with the same speed there is no danger of the pole tips of the magnets impinging on or in any way injuring the armature. After access has been had to the interior of the motor, and there has been an accomplishment of whatever was desired, at the time of dismantling, the parts are restored to position again by a reversal of the above described steps; that is to say the side magnets $H'$, $H'$ are placed in proper position with relation to the armature and are supported by the yoke M. The armature is supported by the band L and the three parts (the two field magnets, and the armature, shaft and bearing plates E, $E'$) are lowered into proper position in the field frame, after which the upper section of the field is again lowered and bolted.

I do not herein claim the lifting devices which are shown for assembling and disassembling the motor, as these devices constitute the subject-matter of my co-pending application, Serial No. 525,356, filed October 29, 1909.

What I claim is:—

1. In a dynamo-electric machine, the combination with an armature and a shaft, of a field frame divided into sections on a plane through the shaft, and a pair of unitary pole pieces secured to the field frame across its plane of separation, said pole pieces being removable with the armature across the plane of separation when the sections of the field frame are apart.

2. In a dynamo-electric machine, the combination with an armature and a shaft, of a field frame divided into sections on a plane through the shaft, and a pair of field magnets comprising each a core and a coil secured to the field frame across its plane of separation, said magnets being removable with the armature across the plane of separation when the sections of the field frame are apart.

3. In a dynamo-electric machine, the combination with an armature and a shaft, of a field frame divided into sections on a plane through the shaft, the field magnets permanently secured to the respective frame sections, and the field magnets secured to the frame across its plane of separation, the latter magnets being removable as units with the armature across the plane of separation when the field sections are apart.

4. In a dynamo-electric machine, the combination of a field frame divided into separable sections, a unitary pole piece extending across the line of separation of the frame sections, and independent means securing the pole piece to each of the frame sections.

5. In a dynamo-electric machine, the combination of a field frame divided into separable sections, a unitary pole piece extending across the line of separation of the frame sections, and independent means extending to the exterior of the field frame for securing the pole piece to each of the frame sections.

6. In a dynamo-electric machine, the combination of a field frame divided into separable sections, a field magnet comprising a core and a coil extending across the line of separation of the frame sections, and independent means securing the pole piece to each of the frame sections.

7. In a dynamo-electric machine, the combination of a field frame divided into separable sections, a field magnet comprising a core and a coil extending across the line of separation of the frame sections, and independent means extending to the exterior of the field frame for securing the pole piece to each of the frame sections.

8. In a dynamo-electric machine, the combination of the field frame, the separable pole piece, field coils, clamping plates pivotally bearing on the pole piece and bearing on the field coils, and means for tightening the clamping plates, substantially as set forth.

9. In a dynamo-electric machine, the combination of the field frame, the separable pole piece, field coils, rocking clamping plates bearing on the pole piece and bearing on the field coils, and means extending through the pole piece for tightening the clamping plates, substantially as set forth.

10. In a dynamo-electric machine, the combination of the field frame, the separable field magnet comprising a coil and pole piece, a clamping plate bearing at one end upon the pole piece and at the other end upon the coil, and means for applying the clamping pressure to the said plate between its points of support on the pole piece and coil, substantially as set forth.

11. In a dynamo-electric machine, the combination of the field frame, the separable field magnet comprising a coil and pole piece, a clamping plate bearing at one end upon the pole piece and at the other end upon the coil, and the bolt extending through the field frame and loosely engaging the clamping plate to apply the clamping pressure thereto between the points of support on the pole piece and coil.

12. In a dynamo-electric machine, the combination of the field frame, the rotary armature, the separable pole piece having circumferential extensions adjacent the armature and projecting lips under said pole piece extensions, rocking clamping plates engaging said lips, and bolts extending through the frame and loosely engaging the plates to apply the clamping pressure thereto.

In testimony whereof I affix my signature, in presence of two witnesses.

FRANK L. SESSIONS.

Witnesses:
E. P. SNIVELY,
C. L. McCONKEY.